(12) United States Patent
Marcouiller

(10) Patent No.: US 8,317,410 B2
(45) Date of Patent: Nov. 27, 2012

(54) ATTACHMENT OF A CONNECTOR TO A FIBER OPTIC CABLE

(75) Inventor: Thomas Marcouiller, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 74 days.

(21) Appl. No.: 12/953,333

(22) Filed: Nov. 23, 2010

(65) Prior Publication Data

US 2011/0289760 A1    Dec. 1, 2011

Related U.S. Application Data

(63) Continuation of application No. 12/403,941, filed on Mar. 13, 2009, now Pat. No. 7,837,396.

(60) Provisional application No. 61/036,271, filed on Mar. 13, 2008.

(51) Int. Cl.
  *G02B 6/36* (2006.01)
  *G02B 6/44* (2006.01)
(52) U.S. Cl. ............. 385/84; 385/76; 385/109; 385/113
(58) Field of Classification Search .................. None
  See application file for complete search history.

(56) References Cited

U.S. PATENT DOCUMENTS

| 4,648,168 | A * | 3/1987 | Nolf et al. ...................... 385/135 |
| 5,074,021 | A * | 12/1991 | Feng et al. .................... 29/281.5 |
| 6,893,164 | B2 * | 5/2005 | Asada ............................. 385/86 |
| 7,088,893 | B2 * | 8/2006 | Cooke et al. ................... 385/100 |
| 7,264,402 | B2 * | 9/2007 | Theuerkorn et al. ............. 385/59 |
| 7,512,304 | B2 * | 3/2009 | Gronvall et al. ............... 385/135 |
| 7,706,650 | B2 * | 4/2010 | Menendez Martin ........ 385/128 |
| 7,837,396 | B2 * | 11/2010 | Marcouiller .................... 385/84 |
| 7,941,021 | B2 * | 5/2011 | Cody et al. .................... 385/100 |
| 8,005,333 | B2 * | 8/2011 | Mullaney et al. ............. 385/135 |
| 2001/0033730 | A1 * | 10/2001 | Fentress ........................ 385/139 |
| 2006/0233506 | A1 * | 10/2006 | Noonan et al. ................ 385/134 |
| 2007/0110384 | A1 * | 5/2007 | Cody et al. .................... 385/134 |
| 2008/0145008 | A1 * | 6/2008 | Lewallen et al. ............. 385/100 |
| 2009/0297107 | A1 * | 12/2009 | Tatat ............................ 385/114 |

FOREIGN PATENT DOCUMENTS

EP    1 855 134 A2    11/2007

OTHER PUBLICATIONS

International Search Report and Written Opinion mailed Jun. 8, 2009.

* cited by examiner

*Primary Examiner* — Rhonda Peace
(74) *Attorney, Agent, or Firm* — Merchant & Gould PC

(57) ABSTRACT

This disclosure describes techniques for attaching a connector to a fiber optic cable. As described herein, lengthwise slits are made into the jacket and the buffer tube of a fiber optic cable, thereby exposing interior segments of the optical fibers of the fiber optic cable. A loop is then made in the fiber optic cable at the slits. The ends of the optical fibers can then telescopically slide out the end of the fiber optic cable. When this happens, the exposed interior segments of the optical fibers slide out of the buffer tube and the jacket through the slits, forming a smaller loop within the loop. A connector may then be attached to the exposed ends of the optical fibers. When the fiber optic cable is unlooped, the exposed interior segments of the optical fibers slide back into the buffer tube and jacket. The jacket may then be resealed.

20 Claims, 4 Drawing Sheets

ATTACHMENT OF A CONNECTOR TO A FIBER OPTIC CABLE

CROSS-REFERENCE TO RELATED APPLICATIONS

This application is a continuation of U.S. patent application Ser. No. 12/403,941, filed Mar. 13, 2009, now U.S. Pat. No. 7,837,396, which claims the benefit of U.S. Provisional Patent Application Ser. No. 61/036,271, filed Mar. 13, 2008, which applications are hereby incorporated by reference in their entireties.

TECHNICAL FIELD

The present disclosure relates generally to fiber optic cable networks. More specifically, the present disclosure relates to methods for connecting a fiber optic connector to a fiber optic cable.

BACKGROUND

Fiber optic telecommunications technology is becoming more prevalent in part because service providers want to deliver high bandwidth communication capabilities to customers. A typical fiber optic telecommunications system includes a network of fiber optic cables (e.g., distribution cables or branch cables such as drop cables or stub cables) routed from a central location (e.g., a service provider's central office) to remote locations in close proximity to subscribers. The fiber optic telecommunications systems also can include additional components, such as fiber distribution hubs housing optical splitters for splitting optical signals and drop terminals providing interconnect locations for facilitating connecting subscribers to the fiber optic network.

U.S. Patent Publication No. 2006/0233506A1, now U.S. Pat. No. 7,349,605, which is hereby incorporated herein by reference in its entirety, discloses a fiber optic network including a distribution cable having factory terminated breakout locations. Each factory terminated breakout location includes a tether having a free end connectorized with a factory installed multi-fiber connector. In the field, the multi-fiber connector allows the tether to be quickly connected to a branch cable. One end of the branch cable includes a multi-fiber connector adapted to interconnect with the multi-fiber connector of the tether to provide optical connections between the optical fibers of the branch cable and the optical fibers of the tether. The other end of the branch cable is connected to a drop terminal.

When an optical connector is installed at the end of an optical cable such as a branch cable, it is often desirable to have a certain length of excess fiber that extends beyond a jacketed end portion of the cable to facilitate the connector installation process. For example, the excess fiber length facilitates low pressure polishing of a ferrule of the fiber optic connector and also facilitates mechanically coupling the fiber optic connector to the fiber optic connector. However, due to friction within the fiber optic cable, it can be difficult to withdraw a sufficient length of fiber from the end of the cable for use during the installation process. This is particularly true for longer lengths of cable (e.g., cable longer than 18 feet). Improved techniques for connectorizing fiber optic cables are needed.

SUMMARY

The present disclosure relates to techniques for facilitating installing a fiber optic connector at the end of a fiber optic cable. One aspect of the disclosure involves using a looping process to allow a length of optical fiber to be withdrawn from an end of a fiber optic cable without breaking the fiber. By providing the length of optical fiber at the end of the fiber optic cable, installation and processing of a fiber optic connector at the end of the fiber optic cable is facilitated. In certain embodiments, the fiber optic cable includes one or more strength members that extend continuously along the length of the fiber optic cable, and the fiber withdrawal process allows the length of fiber to be withdrawn without cutting, breaking or otherwise providing a discontinuity in the one or more strength members.

DETAILED DESCRIPTION

Figure 1:
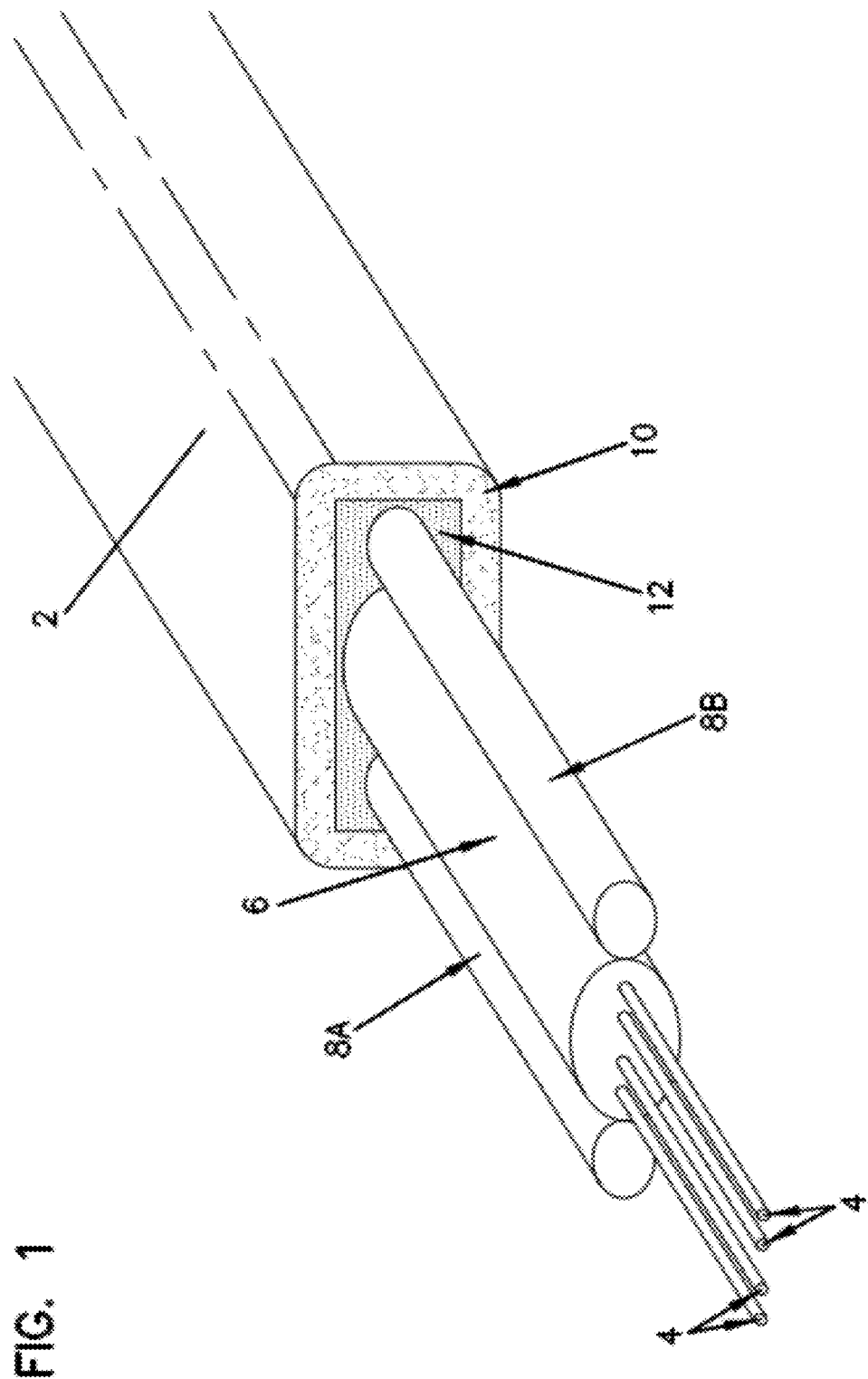
FIG. 1 is a cutaway view of an example fiber optic cable.

This disclosure describes techniques for attaching a fiber optic connector to a fiber optic cable. As described herein, in one embodiment, lengthwise slits are made into a jacket and a buffer tube of a fiber optic cable, thereby exposing interior segments of the optical fibers of the fiber optic cable. A loop is then made in the fiber optic cable at the slits. The ends of the optical fibers can then telescopically slide out the end of the fiber optic cable. When this happens, the exposed interior segments of the optical fibers slide out of the buffer tube and the jacket through the slits, forming a smaller loop within the loop. A connector may then be attached to the exposed ends of the optical fibers. Further processing such as polishing can be performed. Thereafter, the fiber optic cable is unlooped and the exposed interior segments of the optical fibers slide back into the buffer tube and jacket. The buffer tube and jacket may then be resealed and strength members of the fiber optic cable can be coupled to the fiber optic connector.

The techniques described in this disclosure may provide several advantages. For instance, it is frequently desirable to expose terminal segments of the optical fibers that are several inches long when attaching a connector to a fiber optic cable. A terminal segment of an optical fiber is a segment of the optical fiber that is at one end of the optical fiber. In general, for some fiber optic cables, internal friction prevents an optical fiber from sliding within the fiber optic cable when the fiber optic cable is longer than a predetermined distance (e.g., eighteen feet in some cases). If one were to pull an optical fiber within a fiber optic cable that is longer than eighteen feet, the optical fiber would likely break. For this reason, a technician cannot slide the optical fibers within the fiber optic cable to expose the terminal segments of the optical fibers when attaching a connector to the fiber optic cable. However, in accordance with the techniques of this disclosure, the optical fibers do not need to slide within the fiber optic cable for more than a predetermined distance because the slit and loop can be made within the predetermined distance of the end of the fiber optic cable. Consequently, the optical fibers only slide within the portion of the fiber optic cable between the end of the fiber optic cable and the loop. In this way, the techniques may overcome problems associated with internal friction when sliding optical fibers within a fiber optic cable.

The techniques of this disclosure may be implemented as a method that includes receiving a fiber optic cable having an optical fiber that is capable of transmitting light signals; a buffer tube that surrounds the optical fiber; a strength member that provides additional tensile strength to the fiber optic cable; and a jacket that surrounds the strength member, the buffer tube, and the optical fiber. The method also includes creating a lengthwise slit in the jacket of the fiber optic cable, thereby exposing an interior segment of the buffer tube. In addition, the method includes creating a lengthwise slit in the exposed interior segment of the buffer tube, thereby exposing an interior segment of the optical fiber. Furthermore, the method includes bending the fiber optic cable into a bent position at the slit in the buffer tube. The method also comprises sliding, while the fiber optic cable is in the bent position, the optical fiber lengthwise within the buffer tube such that a terminal segment of the optical fiber protrudes outwardly beyond an end of the buffer tube and such that the interior segment of the optical fiber slides out of the slit in the buffer tube. The method also includes attaching, after sliding the optical fiber within the buffer tube, a connector to an end of the terminal segment of the optical fiber. Furthermore, the method includes unbending, after attaching the connector, the fiber optic cable such that the interior segment of the optical fiber returns to its original position within the buffer tube. In addition, the method comprises sealing, after unbending the fiber optic cable, the slit in the jacket.

FIG. 1 is a cutaway view of an example fiber optic cable 2. FIG. 1 is provided for purposes of explanation only and is not intended to represent all types of fiber optic cables that can be used with the techniques of this disclosure. For instance, fiber optic cables including more or fewer components may be used with the techniques of this disclosure.

Fiber optic cable 2 is a type of fiber optic cable that is capable of transmitting optical signals such as pulses of light that convey data. Fiber optic cable 2 may be used in a variety of settings. A wide variety of different types of data may be transmitted over fiber optic cable 2. These types of data may include voice data, Internet data, audio/video data, medical data, military data, business data, governmental data, and other types of data. In certain embodiments, fiber optic cable 2 can be used as a branch cable (e.g., a drop or a stub cable) that branches from a branch location of a main trunk of a distribution cable. In certain embodiments, an opposite end of fiber optic cable 2 can be connected to a drop terminal such as the drop terminal disclosed at U.S. patent application Ser. No. 11/728,043, now U.S. Pat. No. 7,512,304, which is hereby incorporated by reference in its entirety.

As illustrated in the example of FIG. 1, fiber optic cable 2 comprises a set of optical fibers 4A through 4N (collectively, "optical fibers 4"). Each of optical fibers 4 is capable of transmitting pulses of light that convey data. The number of optical fibers in the set of optical fibers 4 may vary depending on the type of fiber optic cable 2. For instance, some types of fiber optic cable include twelve optical fibers, other types of fiber optic cable may include six optical fibers, and still other types of fiber optic cable may only include a single optical fiber. Each of optical fibers 4 includes a core surrounded by a cladding and one or more protective coatings (e.g., acrylate coatings). The cladding reflects light rays in the core, providing total internal reflection. The core of an optical fiber may be made of a variety of materials including glass and plastic. External surfaces of different ones of optical fibers 4 may be differently colored in order to allow a technician to easily identify optical fibers 4.

A buffer tube 6 surrounds optical fibers 4. Buffer tube 6 may serve several purposes. For instance, buffer tube 6 may provide mechanical isolation of optical fibers 4 from other parts of fiber optic cable 2. In addition, buffer tube 6 may protect optical fibers 4 from physical damage. Buffer tube 6 may be a "loose buffer" that is composed of a plastic tube that can contain a lubricating gel that at least partially fills the voids within buffer tube 6 between optical fibers 4.

In addition to optical fibers 4 and buffer tube 6, fiber optic cable 2 also includes a first strength member 8A and a second strength member 8B (collectively, "strength members 8"). In the example of FIG. 1, strength members 8 are disposed on opposed sides of buffer tube 6. Strength members 8 may serve to provide tensile strength and cut resistance to fiber optic cable 2. Strength members 8 may be composed of a variety of materials including epoxy reinforced with glass rovings.

A jacket 10 surrounds buffer tube 6 and strength members 8. Jacket 10 may be composed of a durable material that protects buffer tube 6 and strength members 8 from damage by external physical forces. For instance, jacket 10 may be composed of a variety of different types of materials including plastic, rubber, resin, or another type of material. Jacket 10 may also serve to hold buffer tube 6 and strength members 8 in appropriate positions relative to one another. As illustrated in the example of FIG. 1, jacket 10 holds buffer tube 6 and strength members 8 together such that strength member 8A, buffer tube 6, and strength member 8B are aligned in a plane that is perpendicular to their lengthwise axes. However, it should be appreciated that jacket 10 may hold buffer tube 6 and strength members 8 into other positions.

Furthermore, fiber optic cable 2 may include a filler 12 that fills any excess space within jacket 10. Filler 12 may serve to prevent buffer tube 6 and strength members 8 from moving excessively within jacket 10. Filler 12 may be composed of glass fibers, plastic fibers, organic fibers, a gel, or some other material.

In many circumstances, fiber optic cables, such as fiber optic cable 2, may be manufactured in long segments. For example, fiber optic cable 2 may be several hundred meters long. One end of fiber optic cable 2 may be connected to a drop cable and the opposite end may be unconnectorized. To attach a connector to the unconnectorized end fiber optic cable 2, terminal segments of optical fibers 4 preferably extend beyond the end of fiber optic cable 2. For example, when attaching a multi-fiber connector to fiber optic cable 2, it may be desirable for the terminal segments of optical fibers 4 to extend approximately seven inches (~18 centimeters) beyond the ends of jacket 10, strength members 8, and buffer tube 6.

Several issues may arise when attempting to expose terminal segments of optical fibers 4 when attaching a connector to fiber optic cable 2. For example, friction within fiber optic cable 2 may prevent the exposure of terminal segments of optical fibers 4 by telescopically sliding optical fibers 4 out of an end of buffer tube 6 when fiber optic cable 2 is longer than a certain length.

Figure 2:
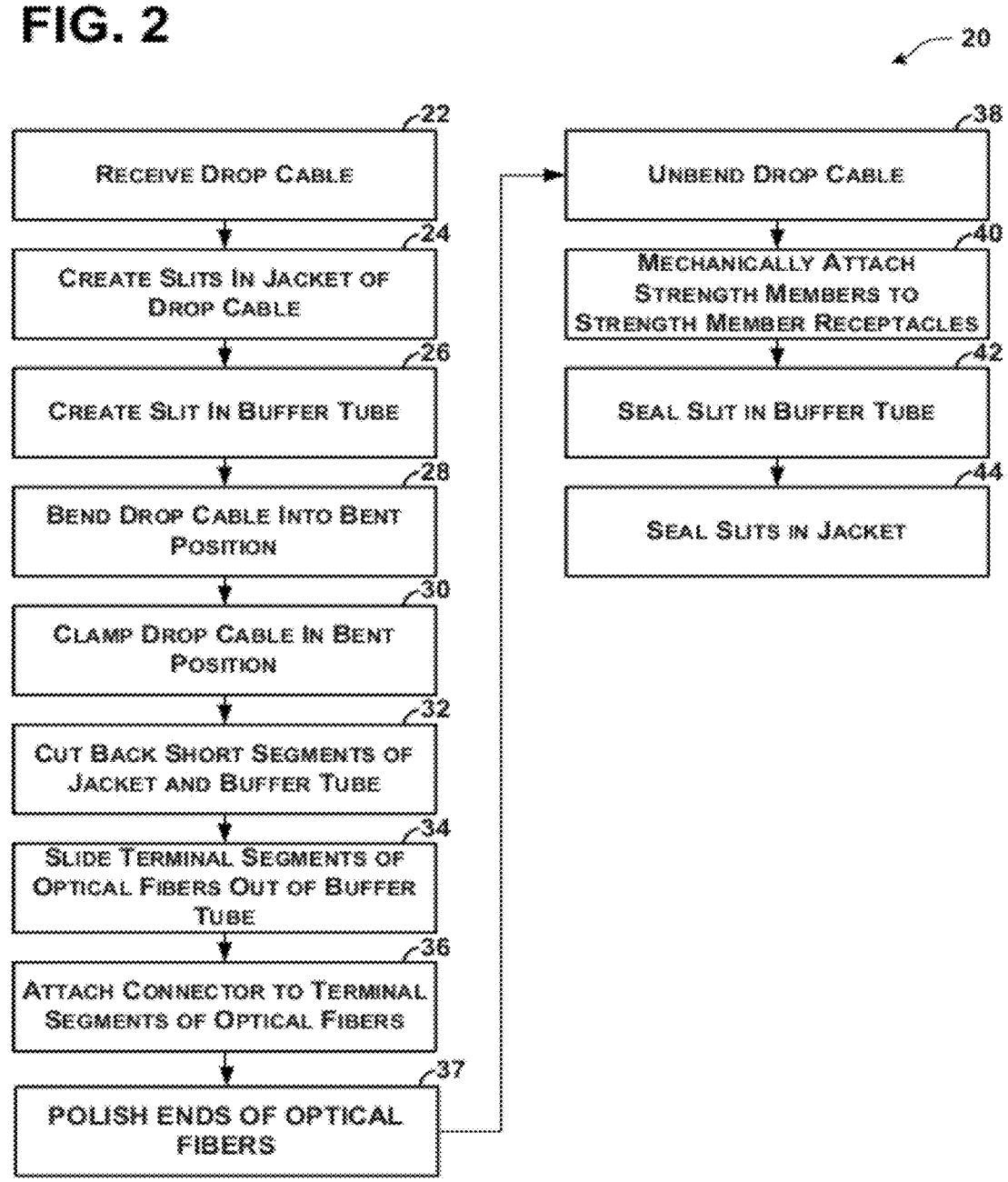
FIG. 2 is a flowchart illustrating an example method to attach a connector to a fiber optic cable by looping the fiber optic cable.

To facilitate exposing terminal segments of optical fibers 4, an operation 20, illustrated in FIG. 2, may be used to attach a connector to fiber optic cable 2. Operation 20 can be used by a technician in the field or at the factory. It should be appreciated that a fully automatic machine or a technician working with a machine may perform operation 20.

Initially, in operation 20, a technician receives fiber optic cable 2 (22). After the technician receives fiber optic cable 2, the technician creates one or more lengthwise slits in jacket 10 of fiber optic cable 2 (24). When the technician wants to expose seven inches (~18 cm) of the terminal segments of optical fibers 4, the technician may create the slits starting at about 3.5 feet (~107 cm) from the end of fiber optic cable 2 and ending about 4 feet 10 inches (~148 cm) from the end of fiber optic cable 2. Thus, the slits may be approximately sixteen inches (~41 cm) long. Creating the slits in jacket 10 exposes an interior segment of buffer tube 6.

After the technician creates the slits in jacket 10, the technician may create a slit in the exposed interior segment of buffer tube 6 (26). The slit in the exposed interior segment of buffer tube 6 may be approximately as long as the slits in jacket 10. Creating the slit in the exposed interior segment of buffer tube 6 exposes interior segments of optical fibers 4.

After the technician creates the slit in buffer tube 6, the technician bends fiber optic cable 2 into a bent position at the slit in buffer tube 6 (28). The technician may bend fiber optic cable 2 in a variety of ways. For example, the technician may bend fiber optic cable 2 into a full or partial loop, an arc, or another type of curve. Furthermore, when the technician bends fiber optic cable 2, the technician may bend fiber optic cable 2 such that the slit in buffer tube 6 is on the concave surface of the curve. Once the technician bends fiber optic cable 2 into the bent position, the technician may use a clamp or another device to hold fiber optic cable 2 in the bent position (30).

When fiber optic cable 2 is clamped into the bent position, the technician may cut back a small amount of jacket 10 and buffer tube 6 at the end of fiber optic cable 2, thereby exposing short terminal segments of optical fibers 4 (32). For example, by stripping back jacket 10 and buffer tube 6, the technician may expose terminal segments of optical fibers 4 that can be about one or two centimeters long.

Next, the technician may use the short exposed terminal segments of optical fibers 4 to slide optical fibers 4 lengthwise within buffer tube 6 such that the terminal segments of optical fibers 4 protrude outwardly beyond the ends of buffer tube 6, strength members 8, and jacket 10 by an appropriate length (34). The technician may slide optical fibers 4 within buffer tube 6 in a variety of ways. For instance, the technician may pull the exposed ends of optical fibers 4, causing optical fibers 4 to slide within buffer tube 6. The technician may continue pulling on the exposed terminal segments of optical fibers 4 until the exposed terminal segments of optical fibers 4 protrude outwardly beyond the ends of buffer tube 6, strength members 8 and jacket 10 by an appropriate length.

When the technician slides optical fibers 4 lengthwise within buffer tube 6, the exposed interior segments of optical fibers 4 slide out of buffer tube 6 through the slit in buffer tube 6 and the slits in jacket 10. When the exposed interior segments of optical fibers 4 slide out of buffer tube 6, the exposed interior segments of optical fibers 4 may assume various shapes depending on how the technician bent fiber optic cable 2. For instance, when the technician has bent fiber optic cable 2 into a curve with the slit in the exposed interior segment of buffer tube 6 on a concave side of the curve and slid optical fibers 4 within buffer tube 6, the exposed interior segments of optical fibers 4 form chords within the curve. In another instance, when the technician has bent fiber optic cable 2 into a loop with the slit in the exposed interior segment of buffer tube 6 on the inner side of the loop and has slid optical fibers 4 within buffer tube 6, the exposed interior segments of optical fibers 4 form smaller loops within the loop of fiber optic cable 2.

After the technician slides optical fibers 4 outwardly beyond the end of buffer tube 6, the technician may attach a connector to the exposed terminal segments of optical fibers 4 (36). The technician may attach a connector to the exposed terminal segments of optical fibers 4 in a variety of different ways. For example, the technician may insert the terminal segments of each of optical fibers 4 into apertures of a multi-fiber ferrule in a connector. After the technician inserts the terminal segments of each of optical fibers 4 into the apertures of the multi-fiber ferrule, the technician may, in this example, polish an end face of the multi-fiber ferrule at which the fiber ends are located.

After the technician attaches the connector to the exposed terminal segments of optical fibers 4, the ends of optical fibers 4 may be polished (37). The ends of optical fibers 4 may be polished in a wide variety of ways. For instance, ends of optical fibers 4 may be polished using a specialized polishing machine. In another instance, some polishing may be performed by hand. Polishing the ends of optical fibers 4 while fiber optic cable 2 is in the bend position may, in some circumstances, ease the polishing process because it may be easier to properly align the ends of optical fibers 4 with a polishing surface when strength members 8 are not attached to the connector.

Once ends of optical fibers 4 are polished, the technician may unbend (i.e., straighten) fiber optic cable 2 (38). As the technician straightens fiber optic cable 2, the exposed interior segments of optical fibers 4 slide back into buffer tube 6 through the slit in buffer tube 6. Furthermore, as the technician straightens fiber optic cable 2, the exposed terminal segments of optical fibers 4 telescopically slide back into buffer tube 6. As the terminal segments of optical fibers 4 slide back into buffer tube 6, the connector slides along with the terminal segments of optical fibers 4 toward the end of buffer tube 6. When the connector slides close enough to the end of buffer tube 6, the technician may insert strength members 8 into strength member receptacles of the connector. The strength member receptacles of the connector may be apertures in the connector that serve to hold strength members 8. Ultimately, when fiber optic cable 2 is straight, the end of jacket 10 is within a jacket collar of the connector and the end of buffer tube 6 is within a buffer collar of the connector. The jacket collar of the connector may be an aperture in the connector that serves to hold jacket 10 and the buffer collar of the connector may be an aperture in the connector that serves to hold buffer tube 6.

When strength members 8 are within the strength member receptacles, jacket 10 is within the jacket collar, and buffer tube 6 is within the buffer collar, the technician may mechanically attach strength members 8 to the strength member receptacles (40). Mechanically attaching strength members 8 to the strength member receptacles may relieve strain that would otherwise be exerted on optical fibers 4. The technician may mechanically attach strength members 8 to the strength member receptacles in a variety of ways. For example, the technician may mechanically attach strength members 8 to the strength member receptacles by crimping strength members 8 within the strength member receptacles. In another example, the technician may mechanically attach strength members 8 to the strength member receptacles with glue, epoxy, or another type of adhesive.

After the technician mechanically attaches strength members 8 to the strength member receptacles, the technician may seal the slit in buffer tube 6 (42). Next, the technician may seal the slits in jacket 10 (44). The technician may seal the slit in buffer tube 6 and the slits in jacket 10 in a variety of ways. For example, the technician may slide a heat shrink tube onto fiber optic cable 2 before attaching the connector. In this example, the heat shrink tube has a length that is approximately equal to the length of the slit in buffer tube 6 and the slits in jacket 10. Furthermore, in this example, after the technician attaches the connector and straightens fiber optic cable 2, the technician may slide the heat shrink tube over the slit in buffer tube 6 and the slits in jacket 10. When the heat shrink tube is positioned over the slit in buffer tube 6 and the slits in jacket 10, the technician may apply heat to the heat shrink tube. When heat is applied to the heat shrink tube, the heat shrink tube shrinks in diameter, forming a tight seal over the slit in buffer tube 6 and the slits in jacket 10. In a second example, after the technician attaches the connector to fiber optic cable 2 and straightens fiber optic cable 2, the technician may wrap a heat shrink wrapping around fiber optic cable 2 at the slit in buffer tube 6 and the slits in jacket 10 such that the heat shrink wrap completely covers the slit in buffer tube 6 and the slits in jacket 10. The technician may then apply heat to the heat shrink wrap. When heat is applied to the heat shrink wrap, the heat shrink wrap contracts and forms a tight seal over the slit in buffer tube 6 and the slits in jacket 10. In a third example, the technician may apply an overmold over the slit in buffer tube 6 and the slits in jacket 10. The overmold seals the slit in buffer tube 6 and the slits in jacket 10.

Figure 3:
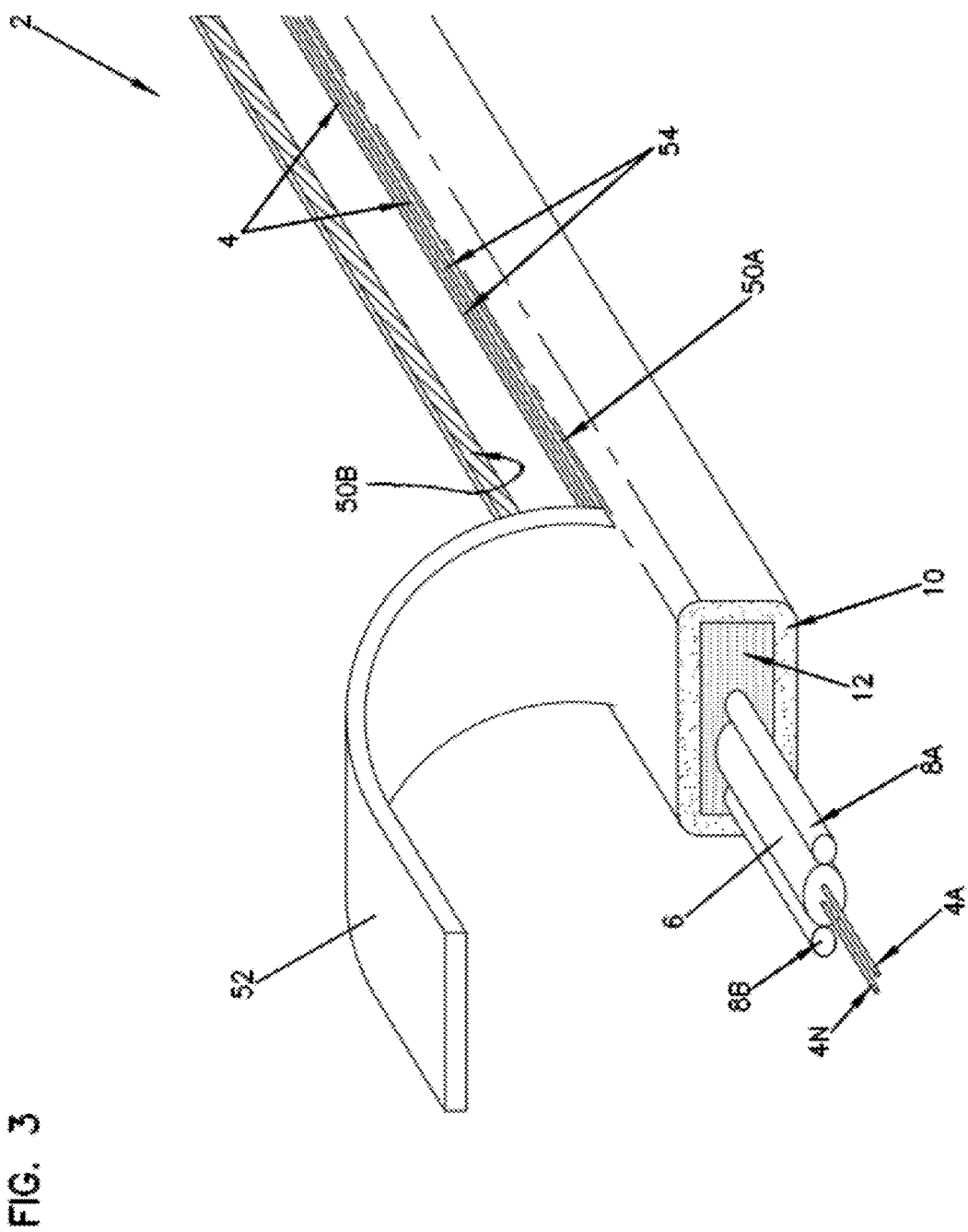
FIG. 3 is an example cross-sectional view of the fiber optic cable with lengthwise slits in the jacket of the fiber optic cable.

FIG. 3 is an example cross-sectional view of fiber optic cable 2 with a lengthwise slit 50A and a lengthwise slit 50B in jacket 10. As illustrated in the example of FIG. 3, slit 50A may run parallel to slit 50B. Furthermore, a third slit (not shown) may be created in jacket 10 that connects slit 50A and slit 50B at one end of slits 50A and 50B. Because the third slit connects slit 50A and slit 50B, the portion of jacket 10 between slit 50A and 50B forms a flap 52. As shown in the example of FIG. 3, flap 52 may be folded back to expose an interior segment of buffer tube 6. When the technician is resealing fiber optic cable 2, the technician may replace flap 52 to its original position.

Furthermore, as illustrated in the example of FIG. 3, the technician has created a slit 54 in buffer tube 6, thereby exposing interior segments of optical fibers 4.

Figure 4:
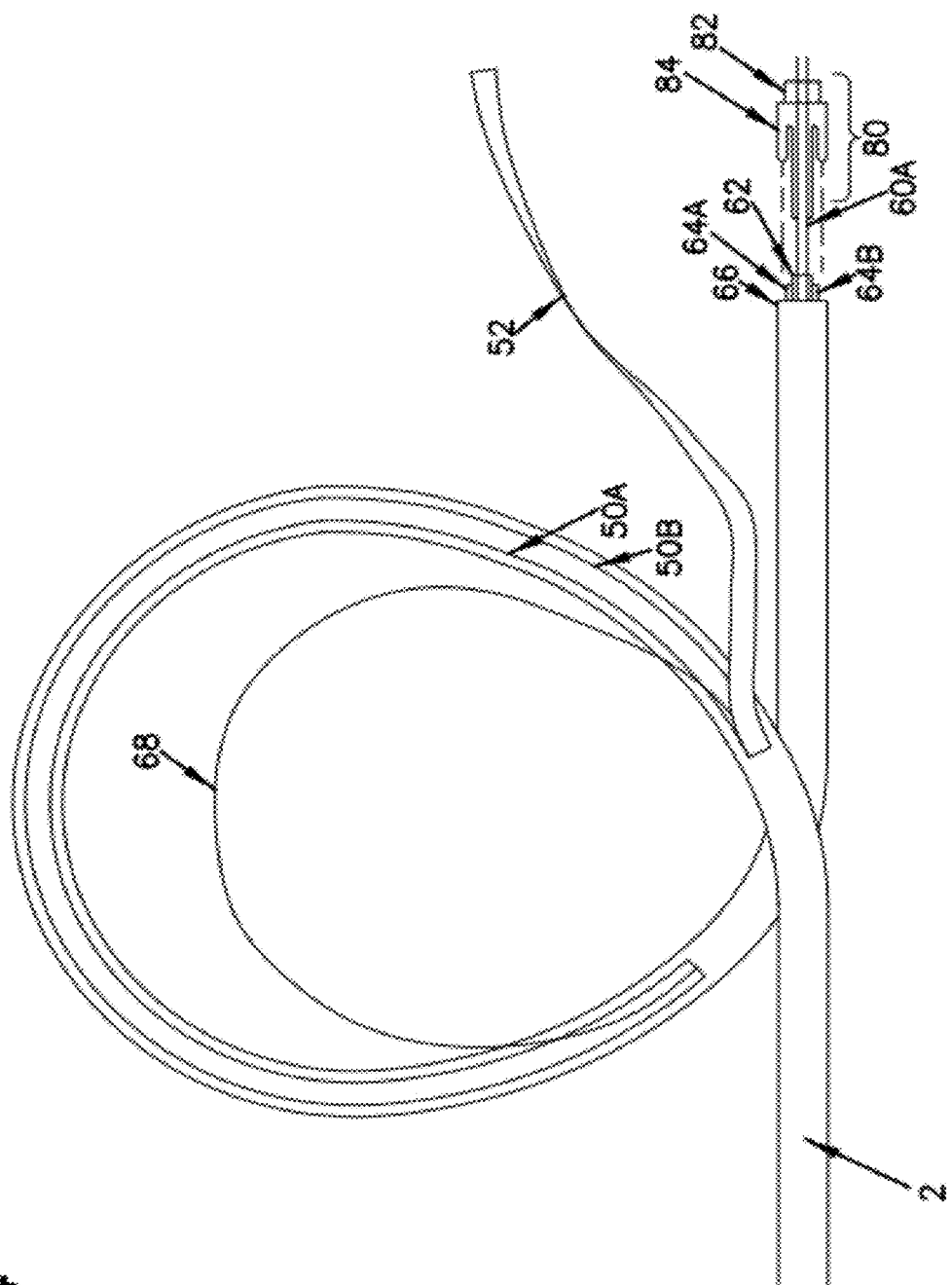
FIG. 4 is an example view of the fiber optic cable after a technician bends the fiber optic cable into a loop.

FIG. 4 is an example view of fiber optic cable 2 after the technician bends fiber optic cable 2 into a loop. As illustrated in the example of FIG. 4, slits 50 and slit 54 are entirely within the looped portion of fiber optic cable 2 and are on the inner (i.e., concave) surface of fiber optic cable 2 in the looped portion of fiber optic cable 2. This view also shows an example position of flap 52 when fiber optic cable 2 is in the loop.

In the example of FIG. 4, the technician has slid terminal segments 60A through 60N (collectively, "terminal segments 60") of optical fibers 4 outwardly beyond an end 62 of buffer tube 6, an end 64A of strength member 8A, an end 64B of strength member 8B, and an end 66 of jacket 10. Consequently, terminal segments 60 of optical fibers 4 protrude beyond end 62 of buffer tube 6, end 64A of strength member 8A, end 64B of strength member 8B, and end 66 of jacket 10. Furthermore, when the technician slid terminal segments 60 of optical fibers 4 outwardly beyond the end of buffer tube 6, interior segments of optical fibers 4 slid out of buffer tube 6 and jacket 10 through slit 54 and slits 50, forming a smaller loop 68 within the loop of fiber optic cable 2. The difference between the circumference of loop 68 and the circumference of the loop of fiber optic cable 2 is approximately equal to the length of exposed terminal segments 60 of optical fibers 4.

Furthermore, the example of FIG. 4 illustrates that a connector 80 may be attached to fiber optic cable 2. As illustrated in the example of FIG. 4, connector 80 includes a multi-fiber ferrule 82. Together, multi-fiber ferrule 82 includes a set of small tubes, each having an inner diameter that is slightly larger than the diameters of optical fibers 4. When attaching connector 80 to fiber optic cable 2, the technician inserts each of optical fibers 4 into a different one of the small tubes in multi-fiber ferrule 82. The small tubes in multi-fiber ferrule 82 serve to align optical fibers 4 so that light carried by optical fibers 4 can be transmitted to corresponding optical fibers in a corresponding connector. Multi-fiber ferrule 82 may be made of a variety of different materials including, but not limited to metals, plastics, ceramics, and other types of materials.

In addition to multi-fiber ferrule 82, connector 80 comprises a housing 84 that surrounds multi-fiber ferrule 82. As illustrated in the example of FIG. 4, housing 84 is shaped such that housing 84 defines a buffer collar that is designed to hold buffer tube 6 when connector 80 is attached to fiber optic cable 2. The buffer collar has a diameter that is slightly larger than the outer diameter of buffer tube 6. In addition, housing 84 is shaped such that housing 84 defines a jacket collar that is designed to hold jacket 10 when connector 80 is attached to fiber optic cable 2. Furthermore, housing 84 is shaped such that housing 84 defines a first strength member receptacle and a second strength member receptacle. Each of strength member receptacles is designed to hold one of strength members 8 when connector 80 is attached to fiber optic cable 2.

From the forgoing detailed description, it will be evident that modifications and variations can be made in the methods of the disclosure without departing from the spirit or scope of the disclosure.

The invention claimed is:

1. A method comprising:
   receiving a fiber optic cable that comprises:
      an optical fiber that is capable of transmitting light that conveys data; and
      a buffer tube that surrounds the optical fiber;
   creating a slit in the buffer tube, thereby exposing an interior segment of the optical fiber;
   bending the fiber optic cable into a bent position at the slit in the buffer tube;
   while the fiber optic cable is in the bent position, sliding the optical fiber lengthwise within the buffer tube such that a terminal segment of the optical fiber protrudes outwardly beyond an end of the buffer tube and such that the interior segment of the optical fiber slides out of the slit in the buffer tube;
   after sliding the optical fiber within the buffer tube, attaching a connector to an end of the terminal segment of the optical fiber;
   after attaching the connector, unbending the fiber optic cable such that the interior segment of the optical fiber returns within the buffer tube.

2. The method of claim 1, wherein bending the fiber optic cable comprises bending the fiber optic cable into a loop.

3. The method of claim 2,
   wherein bending the fiber optic cable into the loop comprises bending the fiber optic cable into a first loop such that the slit in the exposed interior segment of the buffer tube is on an inner side of the first loop; and
   wherein sliding the optical fiber comprises sliding the optical fiber such that the optical fiber forms a second loop within the first loop, the second loop having a shorter circumference than the first loop.

4. The method of claim 1,
   wherein the fiber optic cable further comprises at least one additional optical fiber within the buffer tube; and
   wherein the method further comprises:
      sliding the additional optical fiber lengthwise within the buffer tube such that a terminal segment of the additional optical fiber protrudes outwardly beyond the end of the buffer tube and such that an exposed interior segment of the additional optical fiber slides out of the slit in the buffer tube; and attaching the connector to an end of the terminal segment of the additional optical fiber.

5. The method of claim 1, further comprising, after bending the fiber optic cable and prior to sliding the optical fiber within the buffer tube, clamping the fiber optic cable such that the fiber optic cable remains in the bent position.

6. The method of claim 1, further comprising sealing the slit in the buffer tube.

7. The method of claim 1, further comprising after attaching the connector, sealing the slit in the buffer tube.

8. A method comprising:
    receiving a fiber optic cable that comprises:
        an optical fiber that is capable of transmitting light that conveys data; and
        a jacket positioned around the optical fiber, the jacket extending from a first end to a second end;
    creating a slit in the jacket of the fiber optic cable, thereby exposing an interior segment of the optical fiber, the slit spaced from the first end and the second end of the jacket;
    bending the fiber optic cable into a bent shape at the slit in the jacket; and
    while the fiber optic cable is in the bent shape, sliding the optical fiber lengthwise within the jacket such that a terminal segment of the optical fiber extends outwardly from the first end of the jacket and such that the interior segment of the optical fiber slides out of the jacket through the slit in the jacket.

9. The method of claim 8, further comprising connectorizing the optical fiber when the terminal segment of the optical fiber extends outwardly from the first end of the jacket.

10. The method of claim 8, further comprising polishing an end of the optical fiber when the terminal segment of the optical fiber extends outwardly from the first end of the jacket.

11. The method of claim 8,
    wherein creating the slit in the jacket comprises creating the slit in the jacket such that the slit in the jacket is approximately 41 centimeters in length; and
    wherein sliding the optical fiber comprises sliding the optical fiber such that the terminal segment of the optical fiber protrudes approximately 18 centimeters beyond the first end of the jacket.

12. The method of claim 8, further comprising cutting back a portion of the jacket from the first end of the jacket and thereby exposing at least a portion of the terminal segment of the optical fiber.

13. The method of claim 12, wherein a length of the terminal segment of the optical fiber that is exposed by the cutting back of the portion of the jacket is greater than or equal to about one centimeter.

14. A method of accessing a terminal segment of an optical fiber of a fiber optic cable, the optical fiber adapted to transmit light that conveys data, the method comprising:
    providing the fiber optic cable including a protective layer that surrounds the optical fiber, the fiber optic cable extending between a first end and a second end;
    opening a medial portion of the protective layer of the fiber optic cable;
    bending the fiber optic cable into a bent shape at the medial portion of the protective layer of the fiber optic cable; and
    while the fiber optic cable is in the bent shape, sliding the optical fiber lengthwise within the protective layer such that the terminal segment of the optical fiber extends outwardly from the first end of the fiber optic cable and such that an interior segment of the optical fiber slides out of the fiber optic cable through the medial portion of the protective layer.

15. The method of claim 14, further comprising closing the medial portion of the protective layer of the fiber optic cable.

16. The method of claim 15, further comprising sealing the medial portion of the protective layer of the fiber optic cable.

17. The method of claim 14, wherein the protective layer of the fiber optic cable is a jacket.

18. The method of claim 14, wherein the protective layer of the fiber optic cable is a buffer tube.

19. The method of claim 14, wherein the opening of the medial portion of the protective layer of the fiber optic cable includes lengthwise slitting of the protective layer.

20. The method of claim 14, wherein the opening of the medial portion of the protective layer of the fiber optic cable includes pealing back a flap of the protective layer.

* * * * *